3,351,471
SOLUBILIZED FUMARIC ACID COMPOSITIONS AND METHOD OF MAKING SAME
Walter R. Demler, Hamburg, and Monroe D. Edelman, Margaret R. Hallinan, and James M. Kosmala, Buffalo, N.Y., assignors to Allied Chemical Corporation, New York, N.Y., a corporation of New York
No Drawing. Filed July 10, 1964, Ser. No. 381,931
41 Claims. (Cl. 99—78)

ABSTRACT OF THE DISCLOSURE

Rapidly soluble fumaric acid compositions comprising ultrafine fumaric acid and a surfactant.

---

The present invention relates to an improved method of increasing the solubility rate of fumaric acid in water. More particularly it relates to rapidly cold water soluble compositions comprising ultrafine fumaric acid and a surfactant.

Organic acids, particularly citric and tartaric acids, have been added to food products primarily for preservation purposes and for intensifying flavor. Compositions comprising flavoring materials, sugars and citric acid acidulant, are widely sold as "instant" beverages because they are capable of dissolving rapidly in cold water. Such compositions, however, are quite hygroscopic and have a tendency to absorb moisture and cake upon storage, especially during the hot humid summer months.

Fumaric acid is also an edible acid and it has been suggested to replace the hydroscopic citric acid in the "instant" beverage compositions with fumaric acid which has been ground to a fineness between about 30 and 420 microns and admixed with a partial long chain fatty acid ester of a polyoxyethylene derivative of a hexitol anhydride derived from sorbitol ("Tweens"). The inherent slow rate of solubility of fumaric acid is somewhat improved by this procedure but such compositions have not been entirely satisfactory because the ground fumaric acid gives rise to insoluble material and, due most likely to the development of a static charge on the particles during grinding, the solubility rate is still unsatisfactory.

It is, therefore, a principal object of this invention to prepare novel fumaric acid compositions having an increased rate of solubility in cold water.

It is a further object of this invention to prepare novel fumaric acid compositions which are substantially immediately and completely soluble in cold water.

It is a still further object of this invention to prepare fumaric acid compositions which dissolve rapidly and completely in cold water to yield solutions which are free from scum.

Other objects and advantages of our invention will be apparent and flow from the following description.

We have now made the surprising discovery that compositions comprising fumaric acid in an ultrafine state, i.e. from about 1 to 10 microns size in their largest dimension, and a surfactant of the anionic or nonionic class are rapidly and completely soluble in cold water (about 0 to 5° C.) at a concentration of not more than about .2% by weight and within a maximum period of three minutes.

Ultrafine fumaric acid, with more than 90% of the acid having a particle size of less than 10 microns, in their largest dimension can be obtained in several ways. For example, fumaric acid can be rapidly crystallized by pouring a hot aqueous solution of fumaric acid onto ice or into an ice-water mixture. Preferably the "drowning" mixture is stirred during the process. The slurry may then be filtered and the filter cake dried preferably at a moderate temperature of about 50° to 60° C. The acid also can be reduced to the ultrafine state by mechanical means such as "micronizing," a process which involves subdivision by contact of the crystals at high velocity in a fluid energy mill. Another method consists of rapidly neutralizing a concentrated alkaline aqueous solution of fumaric acid, alkali or alkaline earth metal salt with a mineral acid.

The reduction of the fumaric acid to the desired particle size may be accomplished in the presence of a surfactant or by mixing the ultrafine acid with a surfactant after the subdivision process.

The surfactant used in our novel compositions can be selected from among the large number of anionic or nonionic agents available. It should be recognized however that these agents vary widely among themselves in effectiveness and hence the selection of a specific agent will be guided by its effectiveness. The surfactant should be water-soluble at least to the extent required of the fumaric acid, and it should be stable in the presence of fumaric acid and the other ingredients of the composition for which it is intended, e.g., sugar, flavors, antioxidants, etc. Preferably the surfactant should be nontoxic in character since, as indicated, the fumaric acid composition is to be used principally as an acidulant for food products.

The amount of surfactant used will vary with the effectiveness of the particular agent used. In general, however, the amount required to accomplish the benefits of this invention will lie within the range of about 0.05% to 3.0% by weight. Preferably, in the instance of the more effective agents, the amount used is within the range of 0.1% to 1%. It is believed that the surfactant functions, in part, by coating the individual particles of the fumaric acid and prevents these particles from agglomerating. Consequently on contact with water the surface exposed is large and the rate of dissolution is increased. Accordingly, it is suggested that sufficient surfactant be used to coat substantially all of the ultrafine fumaric acid particles, and that this amount will be within the range of 0.05 to 3.0% by weight.

Representative surfactants which are highly effective in these novel compositions include the following:

| Commercial name: | Active ingredient |
|---|---|
| Aerosol OT-B | Dioctyl ester of sodium sulfosuccinic acid. |
| Triton X–120 | Alkylaryl polyether alcohol, containing 9–10 oxyethylene groups. |
| Tween 60 | Polyoxyethylene sorbitan monostearate. |
| Tergitol NPX | Nonyl phenyl polyethylene glycol ether. |
| Surfynol 102 | Dimethyldecyne diol. |
| Surfynol 104 | Tetramethyldecyne diol. |
| Surfynol 104E | Tetramethyldecyne diol solution in ethylene glycol. |
| Surfynol TG | A mixture of tetramethyldecyne diol and an alkyl phenyl ether of polyethylene glycol in ethylene glycol. |
| Triton X–100 | Iso-octylphenyl polyethoxy ethanol, containing 9–10 units in polyethoxy chain. |
| Triton X–102 | Iso-octylphenyl polyethoxy ethanol, containing 12–13 units in polyethoxy chain. |

| | |
|---|---|
| Triton X-67 | Alkyl polyether alcohol. |
| Triton X-155 | Alkylaryl polyether alcohol. |
| Synthrapol RWP | Ethylene oxide condensate. |
| Victawet 12 | 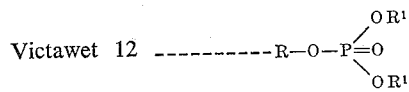 R=medium alkyl group R¹=water solubilizing group |
| Tergitol TMN | Trimethylnonlyl polyethylene glycol ether. |
| Gafac PE 510 | Free acid of complex organic phosphate ester. |
| Igepal CA-630 | Octyl phenoxypolyethyleneoxyethanol. |
| Igepal CO-730 | Nonylphenoxypolyethleneoxyethanol. |
| Igepal DM-970 | Alkylphenoxypolyethyleneoxyethanol. |
| | Lauryl sodium sulfate. |

(Information on structure from "Detergents and Emulsifiers" 1963 Annual—J. W. McCutcheon, Inc.)

The following are representative of the surfactants which are slightly less effective than those cited above and consequently, when used, should be used in amounts ranging from 1 to 3% by weight.

| Commercial name: | Active ingredient |
|---|---|
| Aerosol AY | Diamyl ester of sodium sulfosuccinic acid. |
| Aerosol MA | Dihexyl ester of sodium sulfosuccinic acid. |
| Surfynol 82 | Dimethyloctyne diol. |
| Renex 35 | Polyoxyethylene ether alcohol+urea. |
| Sarkosyl NL-30 | Sodium lauroyl sarcosinate. |
| Sarkosyl O | Oleyl sarcosine. |
| Sarkosyl LC | Cocoyl sarcosine. |
| Surfynol "400" Series | Ethoxylated tetramethyldecyne diol. |
| Petro AG | Alkyl naphthalene sodium sulfonate. |
| Lomar PW | Sodium salt of condensed mononaphthalene sulfo acid. |
| Monawet MT-70 | Di-tridecyl sodium sulfosuccinate. |
| Victawet 35B | (2-ethylhexyl)₅—Na₅(P₃O₁₀)₂. |
| Victawet 58B | (Capryl)₅—Na₅(P₃O₁₀)₂. |
| Nonic 218, 260 | Polyethylene glycol tertdodecyl thioether. |
| Surfax WO | Sulfated propyl oleate. |

(NOTE.—The apparent divergence of results between similar surfactants, e.g. Aerosol OT-B and Aerosol MA, may be due to differences in purity, strength, etc., of these commercial products.)

The following examples will illustrate the process of our invention. Parts are by weight and temperatures are given in degrees centigrade.

*Example 1 (Control run)*

A solution of 100 parts fumaric acid in 1500 parts of hot (95° to 99°) water was poured rapidly onto 1000 parts of ice. The resultant crystalline slurry was agitated and cooled to 20° and then filtered. The filter cake was dried at 50° in vacuo to a moisture content of below 1%. The dried product was passed through a fine screen to break up coherent masses. Microscopic examination indicated that the fine crystals were substantially all less than 10 microns in size.

When 0.4 part of this ultrafine fumaric acid was added to 250 parts of cold (5°) water with agitation, solution occurred in 5 minutes, but a small amount of scum remained.

Repetition of this test procedure but using 0.4 part of unrecrystallized fumaric acid of a particle size of greater than 100 microns did not give complete solution even after one hour of agitation.

*Example 2*

A solution of 200 parts of fumaric acid in 3000 parts of water containing 1.5 parts of Surfynol TG (a mixture of tetramethyldecyne diol and an alkyl phenyl ether of polyethylene glycol in ethylene glycol) was heated to 95° to 100° and then poured rapidly onto 4000 parts of ice. The slurry was filtered and the filter cake dried at 50° to 60° in vacuo. The dried product was reduced to a lump-free ultrafine powder in a Waring Blendor.

Addition of 3.2 parts of this powder to 2000 parts of stirred cold (3°) water gave a clear, scum-free solution within three minutes.

*Examples 3–17*

The procedure of Example 2 above was repeated using other anionic or nonionic surfactants in place of Surfynol TG, as indicated in Table I below. Upon addition of 3.2 parts of the ground product to 2000 parts of cold water (3°) a clear, scum-free solution was obtained within three minutes, and usually in one minute or less.

TABLE I

| Ex. | Surfactant | Amount, parts |
|---|---|---|
| 3 | Surfynol 104 | 1.5 |
| 4 | Surfynol 102 | 1.5 |
| 5 | Triton X-100 | 1.5 |
| 6 | Triton R-67 | 1.5 |
| 7 | Triton X-102 | 4.0 |
| 8 | Triton X-155 | 4.0 |
| 9 | Synthrapol RWP | 4.0 |
| 10 | Tween 60 | 4.0 |
| 11 | Victawet 12 | 1.5 |
| 12 | Tergitol NPX | 1.5 |
| 13 | Tergitol TMN | 4.0 |
| 14 | Gafac PE 510 | 4.0 |
| 15 | Igepal CA 630 | 4.0 |
| 16 | Igepal CO 730 | 4.0 |
| 17 | Igepal DM 970 | 4.0 |

*Example 18*

To a slurry of 50 parts of fumaric acid in 750 parts of water, about 70 parts of 50% aqueous caustic soda were added. The resultant mixture was stirred at ambient temperature until complete solution was obtained. After the addition of 0.5 part of Aerosol OT-B (dioctyl sodium sulfosuccinate) to the solution, 77 parts of 20° Bé. hydrochloric acid were added. The resultant precipitate was separated by filtration and the filter cake was washed with about 1000 parts of water. The washed product was dried in vacuo at 50° to 60° and the dried material was then reduced to a lump-free ultrafine powder by mixing in a Waring Blendor.

The resultant product had a particle size distribution comparable to that of the products of the above examples, and was of equal solubility to those products.

*Example 19*

A solution of 200 parts of fumaric acid in 3000 parts of hot (95°–100°) water was poured rapidly onto about 4000 parts of ice. The resultant slurry of very fine crystals was filtered and then dried in a vacuum oven at 50° to 60°.

Portions (75 parts, 20 parts, 20 parts) of the dried material were thoroughly mixed in a Waring Blendor with amounts (0.75 part, 0.10 part, 0.05 part, resp.) of Surfynol TG and the resulting mixtures were tested for solubility in cold water as in the above examples. All of these compositions were rapidly and completely soluble in cold water.

Example 20

The procedure of Example 19 was repeated using Tergitol NPX (nonyl phenyl polyethylene glycol ether) in amounts of 0.10 and 0.05 part per 20 parts of very fine fumaric acid. These intimately blended compositions were rapidly and completely soluble in cold water.

Examples 21–24

Repetition of the procedure of Example 19 using in place of Tergitol NPX, 0.10 and 0.05 part per 20 parts of very fine fumaric acid of each of the following surfactants—

| Ex.: | Surfactant |
|---|---|
| 21 | Aerosol OT–B. |
| 22 | Tween 60. |
| 23 | Triton X–120. |
| 24 | Lauryl sodium sulfate. | gave compositions which were rapidly and completely soluble in cold water.

Example 25

Fumaric acid admixed with 1% by weight of Aerosol OT–B was ground at the rate of 5 lbs./hr. in a 4" "Micronizer," a fluid energy grinding mill manufactured by Sturtevant Mill Co., using compressed air as the propellant. The ground product had an average particle size of 6–8 microns and was readily and completely soluble in cold water when tested as described in the above examples.

In contrast thereto, fumaric acid containing 1% Tween 60 when ground to an average particle size of about 12 microns in the "Micronizer" gave considerable amounts of undissolved solids when the ground material was "dissolved" in cold water as described in the above examples.

This invention has been described and illustrated by reference to specific embodiments thereof. While the illustrative examples include our preferred procedures, it should be noted that variations in these procedures are possible and many such variations will appear obvious to those skilled in this art in view of the disclosures contained herein. For example, sublimation of fumaric acid in vacuo at a temperature between about 200° and 250° C. gives a needle-shaped crystalline product which can be ground to a very fine particle size (less than 10 microns) which on blending with a suitable surfactant provides a rapidly and completely soluble composition.

We claim:

1. A fumaric acid-containing composition having an increased rate of solubility in cold water which comprises ultrafine fumaric acid having a particle size of not more than 10 microns and a material selected from the group consisting of anionic and nonionic surfactants.

2. A fumaric acid-containing composition having an increased rate of solubility in cold water which comprises ultrafine fumaric acid having a particle size of not more than 10 microns and between about 0.05 and about 3% of a material selected from the group consisting of anionic and nonionic surfactants by weight of said fumaric acid.

3. A fumaric acid-containing composition having an increased rate of solubility in cold water at a concentration by weight of not more than about 0.2% which comprises ultrafine fumaric acid having a particle size of not more than 10 microns and between about 0.1 and about 1% of a material selected from the group consisting of anionic and nonionic surfactants by weight of said fumaric acid.

4. A composition according to claim 2 wherein said surfactant comprises a mixture of a solution of tetramethyldecyne diol and an alkyl phenyl ether of polyethylene glycol in ethylene glycol.

5. A composition according to claim 2 wherein said surfactant is tetramethyldecyne diol.

6. A composition according to claim 2 wherein said surfactant is dimethyldecyne diol.

7. A composition according to claim 2 wherein said surfactant is iso-octylphenyl polyethoxy ethanol.

8. A composition according to claim 2 wherein said surfactant is alkyl polyether alcohol.

9. A composition according to claim 2 wherein said surfactant is alkylaryl polyether alcohol.

10. A composition according to claim 2 wherein said surfactant is ethylene oxide condensate.

11. A composition according to claim 2 wherein said surfactant is polyoxyethylene sorbitan monstearate.

12. A composition according to claim 2 wherein said surfactant comprises a compound having the formula—

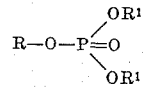

wherein R is a medium alkyl group and $R^1$ is a water solubilizing group.

13. A composition according to claim 2 wherein said surfactant is nonyl phenyl polyethylene glycol ether.

14. A composition according to claim 2 wherein said surfactant is trimethylnonyl polyethylene gylcol ether.

15. A composition according to claim 2 wherein said surfactant is octyl phenoxypolyethyleneoxyethanol.

16. A composition according to claim 2 wherein said surfactant is nonylphenoxypolyethyleneoxyethanol.

17. A composition according to claim 2 wherein said surfactant is alkylphenoxypolyethyleneoxyethanol.

18. A composition according to claim 2 wherein said surfactant is dioctyl sodium sulfosuccinate.

19. A composition according to claim 2 wherein said surfactant is lauryl sodium sulfate.

20. A process for producing a fumaric acid-containing composition having an increased rate of solubility in cold water which comprises mixing ultrafine fumaric acid having a particle size of not more than 10 microns and a material selected from the group consisting of anionic and nonionic surfactants.

21. A process for producing a fumaric acid-containing composition having an increased rate of solubility in cold water which comprises mixing ultrafine fumaric acid having a particle size of not more than 10 microns and between about 0.05 and about 3% of a material selected from the group consisting of anionic and nonionic surfactants by weight of said fumaric acid.

22. A process for producing a fumaric acid-containing composition having an increased rate of solubility in cold water at a concentration by weight of not more than about 0.2% which comprises mixing ultrafine fumaric acid having a particle size of not more than 10 microns and between about 0.1 and about 1% of a material selected from the group consisting of anionic and nonionic surfactants by weight of said fumaric acid.

23. A process according to claim 21 wherein said surfactant comprises a mixture of a solution of tetramethyl decynediol and an alkyl phenyl ether of polyethylene glycol in ethylene glycol.

24. A process according to claim 21 wherein said surfactant is tetramethyldecyne diol.

25. A process according to claim 21 wherein said surfactant is dimethyldecyne diol.

26. A process according to claim 21 wherein said surfactant is iso-octylphenyl polyethoxy ethanol.

27. A process according to claim 21 wherein said surfactant is alkyl polyether alcohol.

28. A process according to claim 21 wherein said surfactant is alkylaryl polyether alcohol.

29. A process according to claim 21 wherein said surfactant is ethylene oxide condensate.

30. A process according to claim 21 wherein said surfactant is polyoxyethylene sorbitan monostearate.

31. A process according to claim 21 wherein said surfactant comprises a compound having the formula—

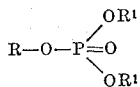

wherein R is a medium alkyl group and R¹ is a water solubilizing group.

32. A process according to claim 21 wherein said surfactant is nonyl phenyl polyethylene glycol ether.

33. A process according to claim 21 wherein said surfactant is trimethylnonyl polyethylene glycol ether.

34. A process according to claim 21 wherein said surfactant is octyl phenoxypolyethyleneoxyethanol.

35. A process according to claim 21 wherein said surfactant is nonlyphenoxypolyethyleneoxyethanol.

36. A process according to claim 21 wherein said surfactant is alkylphenoxypolyethyleneoxyethanol.

37. A process according to claim 21 wherein said surfactant is dioctyl sodium sulfosuccinate.

38. A process according to claim 21 wherein said surfactant is lauryl sodium sulfate.

39. A process for producing a fumaric acid-containing composition having an increased rate of solubility in cold water which comprises mixing, in hot aqueous solution, fumaric acid and between about 0.1 and about 1% of a material selected from the group consisting of anionic and nonionic surfactants by weight of said fumaric acid, drowning the hot mixture on ice and recovering the resultant ultrafine powder having a particle size of not more than 10 microns by filtering and drying.

40. A process for producing a fumaric acid-containing composition having an increased rate of solubility in cold water which comprises dissolving fumaric acid in hot aqueous solution, drowning said fumaric acid on ice, recovering the resultant ultrafine powder having a particle size of not more than 10 microns by filtering and drying and thereafter mixing said powder with between about 0.1 and about 1% of a material selected from the group consisting of anionic and nonionic surfactants by weight of said fumaric acid.

41. A process for producing a fumaric acid-containing composition having an increased rate of solubility which comprises micronizing a mixture of fumaric acid containing about 1% of dioctyl sodium sulfosuccinate by weight of said fumaric acid to a particle size of not more than 10 microns.

References Cited

UNITED STATES PATENTS

| 3,181,953 | 5/1965 | Van Ness | 99—78 |
| 3,169,872 | 2/1965 | Rau | 99—78 |
| 3,152,909 | 10/1964 | Raffensperger | 99—78 |
| 3,108,002 | 10/1963 | Raffensperger | 99—78 |
| 3,009,810 | 11/1961 | Raffensperger | 99—78 |

FOREIGN PATENTS 765,885  1/1957  Great Britain.

A. LOUIS MONACELL, *Primary Examiner.*

M. VOET, *Assistant Examiner.*